(19) United States Patent  
Fan

[11] Patent Number: 4,988,521
[45] Date of Patent: Jan. 29, 1991

[54] READY-TO-EAT CEREAL OF REDUCED SODIUM CONTENT AND METHOD OF PREPARATION

[75] Inventor: Steve T. Fan, Maple Grove, Minn.

[73] Assignee: General Mills, Inc., Minneapolis, Minn.

[21] Appl. No.: 200,997

[22] Filed: Jun. 1, 1988

[51] Int. Cl.$^5$ ............................................. A21D 13/00
[52] U.S. Cl. ........................................ 426/93; 426/94; 426/96; 426/302; 426/309; 426/620; 426/621
[58] Field of Search ................... 426/93, 94, 302, 620, 426/621, 309, 96

[56] References Cited

U.S. PATENT DOCUMENTS

| | | | |
|---|---|---|---|
| 1,989,480 | 1/1935 | Kellogg | 426/309 |
| 1,990,382 | 2/1935 | Kellogg | 426/309 |
| 2,093,260 | 9/1937 | Wilder et al. | |
| 3,806,613 | 4/1974 | Carroll et al. | 426/309 |
| 3,852,491 | 12/1974 | Malzahn | 426/621 |
| 4,614,657 | 9/1986 | Sheng et al. | 426/96 |

OTHER PUBLICATIONS

Breads, published by Time-Life Books, Inc., 1981, pp. 98, 99 and 115.

*Primary Examiner*—Marianne Cintins
*Assistant Examiner*—Mary S. Mims
*Attorney, Agent, or Firm*—John A. O'Toole

[57] ABSTRACT

Disclosed are ready-to-eat cereals of reduced salt content which nonetheless exhibit the salt taste perception of ready-to-eat cereals having conventional salt levels as well as methods of preparing such R-T-E cereals. The methods of preparation comprise: (A) providing R-T-E cereal base pieces fabricated from a cereal composition having a first, reduced salt concentration, (B) topically applying to the cereal base pieces a saline solution comprising sodium chloride and water in sufficient amounts as to apply about 0.5% to 1.5% by weight (dry basis) to form coated cereal pieces, and (C) drying the coated cereal pieces to a final moisture content of less than about 5%.

18 Claims, No Drawings

READY-TO-EAT CEREAL OF REDUCED SODIUM CONTENT AND METHOD OF PREPARATION

BACKGROUND

1. Technical Field

The present invention relates to food products and to their methods of preparation. More particularly, the present invention relates to ready-to-eat cereal products of reduced sodium content.

2. The Prior Art

Due to current health awareness, consumers are ever increasingly interested in food products containing lower amounts or concentrations of sodium. Numerous problems are associated with the provision of sodium reduced food Products. First and foremost, consumer's tastes are accustomed to familiar taste profiles. Simple reductions in common salt or sodium levels are readily taste apparent and for most consumers are unacceptable. While this phenomenon is common with most foods, the problem is particularly severe with cereal products of all types. From time immemorable, unacceptable blandness has been characterized "like bread without salt."

Ready-to-eat ("R-T-E") cereals are well known and popular food items including both presweetened and regular R-T-E cereals. R-T-E cereals, of course, as cereal based products typically include generous amounts of salt which are sufficient to impart salt flavor levels acceptable to consumers. Such salt levels typically are at least 1.8% (200 mg/oz. of sodium) or as much as about 4% salt by weight (400 mg/oz.).

A wide variety of approaches have been taken in the art to reduce the sodium contents of foods. Most commonly, potassium chloride has been employed in partial substitution for sodium chloride. However, potassium chloride has a bitter, metallic taste and such substitution has met with limited success. Moreover, the role of salt in flavor development and taste sensation is complex. In R-T-E cereals, an additional known technique includes an increase in cook time to develop more highly flavored products. Other approaches useful in one food type often are not applicable in other food types.

The present invention resides, in part, in the surprising discovery that salt apparently is not important to the development of desirable cooked cereal flavor but merely to taste perception. Stated otherwise, salt appears to act as a flavor potentiator rather than an important chemical intermediary to cooked cereal flavor development regardless of whether cook times are short or, more surprisingly, whether cook times are long. The present invention further resides in part that the distribution of salt in R-T-E cereals is most important to the perception of saltiness, i.e., the taste appreciation of flavor potentiation induced by salt. While it has been known to apply salt to the surface of cereal products so as to improve shelf life (see for example U.S. Pat. No. 2,093,260, issued Sep. 14, 1937 to H. K. Wilder et al.), it has now been discovered that by fabricating R-T-E cereals having a first, reduced salt portion as part of the cereal formulation and a second portion evenly and topically applied to the exterior of cereal pieces, finished R-T-E cereals can be provided with reduced actual salt content but with minimal adverse taste effects.

SUMMARY OF THE INVENTION

The present invention relates to R-T-E cereals wherein the total salt content is reduced without sacrificing the degree of taste achieved. The salt reduction is achieved by distributing the reduced salt content between a portion being distributed uniformly throughout the cereal piece and a second portion being uniformly topically applied to the cereal pieces' exterior.

In its method aspect, the present invention provides methods for preparing R-T-E cereals of reduced salt content but whose taste profile is organoleptically equivalent to conventional cereals having higher salt concentrations. The present methods include as essential steps (A) providing R-T-E cereal base pieces fabricated from a cereal composition having a first interior salt portion as part of the cereal piece having a reduced salt concentration relative to a full salt cereal piece, (B) topically applying to the cereal base pieces a saline solution, comprising sodium chloride and water in sufficient amounts as to apply about 0.5% to 1.5% by weight (dry basis) to form coated cereal pieces having a second, surface salt portion, and (C) drying the coated cereal pieces to a final moisture content of less than about 5%.

DETAILED DESCRIPTION OF THE INVENTION

The present invention relates to R-T-E cereals, particularly non-sugar coated R-T-E cereals, having a reduced salt content. In its method aspect, the present invention relates to processes for the preparation of such R-T-E cereals comprising the steps in sequence of: (A) providing a R-T-E cereal base having a reduced salt content, (B) topically applying the R-T-E cereal pieces with the saline solution, and (C) drying the cereal. Each of these product preparation steps as well as product use are described in greater detail below.

Throughout the specification and claims, percentages and ratios are by weight, and temperatures in degrees Fahrenheit, unless otherwise indicated.

The present method involves the splitting of the total amount of salt into two portions. The first portion is added to the cereal formulation, which goes through normal processing to form the R-T-E cereal pieces. The second portion is prepared as a salt solution and sprayed on the surface of the cereal. With this method, the salt on the surface is so strategically placed that upon consumption of the cereal it provides instant flavor potentiation. During the chewing stage, the salt added inside the product will provide continuous flavor potentiation. Therefore, sufficient salt is always present to maintain the flavor intensity throughout the entire eating period.

The ratio of salt applied between the inside and the outside of the product must be carefully controlled. Too much salt on the surface will make the product taste like a snack. An additional disadvantage is that there will not be enough salt available for flavor potentiation during the later stages of the eating experience. Too little salt on the surface will reduce the initial flavor potentiation.

A. Providing R-T-E Cereals of Reduced Salt Content

An important first step is the provision of R-T-E cereal pieces having a reduced salt content relative to conventional levels. Various R-T-E cereals which are popular, e.g., toasted whole wheat flakes sold under the Wheaties ® trademark, have an established taste profile including an established or "full salt" concentration to which consumers have become accustomed. While the selection of the salt concentrations of these full salt products may once primarily have been an optimized choice, once the customer base has become familiar with the original taste profile, great care must be taken to insure that deviations in all ingredients, including especially salt, must be kept to an absolute minimum in order to avoid deviations in organoleptic properties. Any modifications in the product must be proven by hedonic testing not to affect materially this established taste profile unless the modification clearly results in an improvement in flavor. If whole wheat flakes otherwise identical but of reduced salt concentration, e.g., reduced by one third, were to be prepared, then the average consumer would immediately discern an undesirable taste deterioration. Similar problems would exist with other R-T-E cereals, e.g., puffed, ring shaped whole oat flour based cereals such as marketed under the Cheerios ® brand, although the established salt concentration will vary modestly between about 1.8% to 4.0% salt.

It is important in the present invention that R-T-E cereal pieces be employed whose salt content has been reduced about two thirds from their established or conventional full salt value, i.e., ranging from about 0.5% to 2.0% salt, preferably about 0.5% to 1.2% or for best results less than 1.2%. It is also important that the first salt portion be uniformly distributed throughout the cereal piece. All manner and types of R-T-E cereal pieces can be employed in the present invention including those cereals based upon wheat, whole wheat, corn, rice, barley, oats and mixtures thereof. The cereal pieces can be of any shape and size including puffed and unpuffed, toasted or untoasted, and whether or not vitamin fortified or other forms, such as corn flakes, shredded wheat, puffed wheat, puffed rice, expanded oats, puffed corn, bran flakes, whole bran cereal, breakfast cereals in the form of extruded and puffed doughs, and the like. Of course, the R-T-E cereal art is well developed and the skilled artisan will have no difficulty selecting cereal formulations and preparation techniques for the provision of R-T-E cereal pieces herein of reduced salt content.

The present invention finds particular suitability for use in connection with toasted whole wheat flakes and with puffed oat based rings. While the present invention can be used in connection with sugar coated cereals, the present invention finds particular suitability for use in connection with non-sugar coated cereals since sugar coating masks modestly the benefits of the present invention. The present invention can also be advantageously used with presweetened cereals which have not been sugar coated, i.e., such as have been presweetened with a high potency sweetener such as aspartame (see, for example, U.S. Pat. No. 4,540,587 issued Sep. 10, 1985 to Gajewski) and which is incorporated herein by reference using an aqueous dispersion of aspartame suspended with a cold water soluble gum.

B. Topically Applying a Saline Solution

An additional subsequent essential step is to apply a saline solution to the R-T-E cereal pieces of reduced salt content. Unlike oily snack products, dry salt will not adhere to the cereal pieces. Wetting the cereal piece to promote solid salt adhesion, however, would require application of water in amounts which damage the textural qualities of the cereal piece. In preferred embodiments, this essential step is practiced immediately prior to the final drying step, i.e., without intermediate R-T-E cereal processing steps which would materially alter the physical surface of the cereal piece. However, when fragile pieces, e.g., whole wheat flakes are employed, the topical saline solution application step can and preferably will be performed prior to flaking and toasting such as by applying to pellets formed from cooked cereal dough. For puffed cereals, the saline solution should be applied after puffing. For sugar coated cereals, it is best that the saline solution application should follow the sugar coating operation. Steps which do not materially alter the cereal piece surface to cause penetration of the topical salt into the cereal piece interior, e.g., vitamin fortification, however, can be practiced subsequently.

In preferred embodiments, the saline solution consists essentially of salt and water. The saline concentration can range from about 1% to 50%. Preferred solutions comprise salt concentrations ranging from about 15% to 40% salt. Higher salt concentrations are desired, in part, since less water is added which subsequently must be removed by expensive drying. Also, dilute saline solutions can adversely affect product textural attributes. On the other hand, very high salt concentrations are undesirable since they are difficult to work with since salt precipitation will tend to occur. Moreover, providing an even coating to the cereal pieces is more difficult. For best results, the saline solution consists essentially of about 20% salt. In less preferred embodiments, the saline solution can additionally comprise from about 0.1% to 10% of a high potency sweetener and from about 0.1% to 1% of a gum to aid suspension and adherence of the high potency sweetener.

Any conventional application apparatus and technique can be used to practice the present enrobing or application step. Generally, a useful technique involves tumbling. The cereal piece(s) and saline solution are each charged in any order to a rotating drum and tumbled for a sufficient time to achieve an even distribution of the suspension on the comestible. Preferably, the saline solution is added after the cereal has been added to the drum. Another useful technique is simply spraying the aqueous solution over those cereals which are desirably not tumbled due to the shape, frangibility, etc. Generally about 30% to 70%, preferably about 40% to 60% of the total salt can be applied topically while the balance of the salt is associated with the cereal formulation. For best results, the first and second salt portions each comprise about 50% of the total salt.

C. Drying

An essential finish step in the present method is to dry or dehydrate the topically coated or enrobed cereal pieces to remove the moisture added by the saline solution to a moisture content of less than about 5%, and preferably less than about 3% to form the reduced salt R-T-E cereals of the present invention. Any conventional method of drying and equipment can be used to reduce the moisture content of the enrobed cereal pieces. The drying can be accomplished using such equipment as rotary bed, tray and belt dryers. The preferred dehydration technique is forced hot air convection drying. Of course, since aspartame is thermally unstable, preferred drying techniques are those which are practiced at reduced temperatures, e.g., below about 150° F.

The finished reduced salt content product yields a salt taste perception and cereal flavor profile similar to cereals containing higher conventional salt concentrations and desirably comprises from about 0.5% to 3% total salt, preferably from about 1.2% to 1.8% salt.

Without further elaboration, it is believed that one skilled in the art can, using the preceding description utilize the present invention to its fullest extent. The following specific embodiments are, therefore, to be construed as merely illustrative and not limitative of the remainder of the disclosure.

EXAMPLE 1

A reduced salt whole wheat flake R-T-E cereal is made according to the following procedure. Additionally, for a two-way comparison, a conventional, full salt (3% salt) whole wheat flake and, thirdly, a reduced salt R-T-E cereal base (2.0% salt or a one-third reduction from the full salt level) were similarly prepared.

A syrup was first formed by admixing all ingredients except the wheat. The wheat is introduced into a batch cooker and the syrup is then added to the wheat. The mixture was cooked under pressure (18 to 25 psig) for about 60 minutes to form a cooked cereal dough. The cooked cereal dough was extruded with a forming extruder to make pellets approximately 5/32 inch in diameter and ¼ inch in length. The pellets were dried to a moisture content of between 20% to 23%. A flaking roll was then used to flake the pellets. Thereafter the pellets were toasted at a temperature between 350° to 400° F. to form the ready-to-eat cereal bases including (1) full salt (3%), (2) a first reduced salt (2%), and (3) a second reduced salt cereal base (0.7% salt).

In the preparation of the present reduced salt R-T-E cereal, a saline solution was prepared by dissolving 20 parts of salt and 80 parts of water and applied to the third cereal base (0.7% salt). For every 100 pounds of cereal, 6.5 pounds of the salt solution was sprayed onto the surface to form a coated cereal piece. Thereafter, the coated cereal pieces were dried in a dryer to a moisture content of about 2% to 3%.

Both the full salt (3% salt) and first reduced-salt (2% salt) products not of the present invention were evaluated by an in-house sensory panel composed of 40 members.

In the first test, the full salt product (3% salt) and the reduced-salt product by simple reduction (2% salt) were compared side-by-side in the milk. The results are shown in Table 1.

TABLE 1

| | Sensory score (15 point scale) | | |
|---|---|---|---|
| Flavor attribute | Full salt | Reduced salt | Confidence level |
| Toasted flavor | 8.7 | 7.7 | 99% |
| Salt intensity | 5.9 | 4.4 | 99.9% |
| Cooked wheat flavor | 8.6 | 7.8 | 96% |
| Overall flavor | 8.4 | 7.3 | 99% |

Note: The confidence level indicates the degree of confidence that the two products are different on the specific flavor attribute.

The results indicate significant differences in the flavor attributes if the salt reduction is achieved by simply reducing the salt in the formula.

In the second test, the full salt product (3%) and the reduced-salt product prepared by the current invention (2% salt in total but with 0.7% in the interior and 1.3% applied to the exterior) were compared. The results are shown in Table 2.

TABLE 2

| | Sensory score (15 point scale) | | |
|---|---|---|---|
| Flavor attribute | Full salt | Reduced salt | Confidence level |
| Toasted flavor | 8.0 | 7.8 | <90% |
| Salt intensity | 6.4 | 6.1 | <90% |
| Cooked wheat flavor | 8.1 | 7.9 | <90% |
| Overall flavor | 8.5 | 7.8 | <90% |

The results indicate no significant difference in the flavor attributes between the full salt and reduced-salt products if the reduced-salt product is prepared according to current invention.

EXAMPLE 2

Puffed Oat Cereal

A similar, single comparison was made using a conventional puffed oat cereal. The comparison was made between a full salt cereal (2.2% salt) and a reduced-salt cereal of the present invention (one-third reduction in salt). The full salt and reduced-salt cereal pieces were otherwise identical in formulation.

Full Salt Product Preparation

The ingredients were mixed in a mixer until a uniform mixture was formed. The dry mix was introduced into a continuous, low temperature (100°–120° F.), long time (resident time about one hour) extruder at a rate of 10 pounds per minute. Water was also introduced into the extruder at a rate of 5 pounds per minute. The mixture was cooked by the friction during the extrusion of the mixture. Because the steam was allowed to escape through the vents in the extruder, no pressure build-up occurred and the mixture was cooked at a temperature near the boiling temperature of the water. As the cooked dough exited the extruder, a die formed the dough into small doughnut-shaped pellets with a diameter about 1/8 inch and a thickness of about 1/16 inch. The pellets were dried to a moisture in the range of 9% to 13%. The dried pellets were fed into a puffing chamber under high steam pressure (75 to 110 psig) and high temperature (400°–600° F.), and as the pellets exited the chamber, highly puffed, full salt oat based, R-T-E cereal base was produced.

Reduced-salt Product Preparation

A reduced-salt R-T-E cereal base (0.6% salt cereal base) was produced the same way as the full salt product. However, an additional surface salt application step was employed. The composition of the salt solution consisted of 20 parts salt, 12 parts sugar, and 68 parts water. For every 100 pounds of cereal, 4.3 pounds of salt solution was sprayed on the surface (the quantity of salt applied on the cereal surface was 0.9 pounds per 100 pounds of cereal). The cereal was dried to bring the moisture down to 3% to 4% range. The reduced-salt product has one-third less sodium than the full salt counterpart.

Evaluation a. In-house Sensory Panel

Full salt and reduced-salt product were evaluated by an in-house sensory panel composed of 40 members. The two products were compared side-by-side to evaluate the sensory attributes. The panelists were asked to rate the intensity of oat flavor, toast flavor, saltiness, and overall flavor on a 15-point scale. No significant difference was found in all the flavor attributes.

b Consumer Panels

Full salt and reduced-salt product were evaluated by the consumers at in-home usage setting. Two consumer panels were used; one to evaluate the full salt product, the other to evaluate reduced-salt product. Each panel consisted of 200 members. Panelists were asked to rate the intensity of overall flavor, saltiness, oat flavor, toasted flavor, and bitterness based on 7-point scale. The results are shown in Table 3.

TABLE 3

| Flavor attribute | Full salt | Reduced salt |
| --- | --- | --- |
| Overall flavor | 5.7 | 5.5 |
| Saltiness | 1.9 | 2.8 |
| Oat flavor | 4.5 | 4.8 |
| Toasted flavor | 5.0 | 4.9 |
| Bitterness | 1.8 | 1.8 |

The consumer scores for two products with different salt contents were remarkably similar in all flavor attributes except saltiness. Surprisingly, the consumers regarded the reduced-salt product as being saltier than the full salt product. This demonstrated again the effectiveness of the current invention in reducing the salt content while maintaining the flavor intensity.

c. Pyrazine Analysts

The two products were also analyzed for total pyrazine concentration. Pyrazines are the primary constituents of cooked cereal flavor. The full salt product had a total pyrazine concentration of 898 ppb while the reduced-salt product had a total pyrazine concentration of 900 ppb. Both products contained almost the same amount of pyrazine. This showed that the current invention does not affect the flavor production; its effectiveness relies on modifying the distribution of the salt in the product and achieves the same flavor perception by using less salt.

EXAMPLE 3

High Fiber Cereal

A similar, single comparison was made using a conventional, high fiber cereal. The comparison was made between a full salt (1.5% salt) and a reduced salt cereal of the present invention (40% reduction in sodium). The full salt and reduced salt pieces were otherwise identical in formulation.

The ingredients (wheat bran, corn bran, salt, and sodium bicarbonate) were mixed in a continuous screw mixer. The mixture was fed into a Wenger X-25 extruder at a rate of 13 pounds per minute to form needle-like pellets. During extrusion, high fructose corn syrup at a rate of 1.2 pounds per minute and water at a rate of 1.3 pounds per minute were pumped into the extruder. The pellets were toasted at a temperature in the range of 350°–400° F.

Both full salt and reduced-salt products required a spraying operation. For the full salt product, a spray slurry was prepared consisting of 200 parts water, 7 parts aspartame, and 0.6 parts xanthan gum. The spraying was accomplished in an enrober at a rate of 7.4 grams of spray slurry per pound of cereal.

For the reduced-salt product, a spray slurry was prepared consisting of 200 parts water, 76 parts salt, 7 parts aspartame, and 0.6 parts xanthan gum. The spraying was conducted in an enrober at a rate of 10.1 grams of spray slurry per pound of cereal. With the present invention, the sodium content of the cereal was reduced by almost 40%.

Evaluation

Both products were evaluated by consumer panels. Separate panels were used for each product composed of 200 members. The products were compared and preference rated against numerous other cereals to yield "satisfaction" scores. The results indicated that the two products received similar satisfaction scores; the full salt product had a share score of 10.3 while the reduced-salt product had a share score of 11.1. The difference was not significant (less than 90% confidence level). The results demonstrated that with the present invention the sodium content could be reduced by 40% and yet the cereal was still well received by the consumers.

What is claimed is:

1. A method for preparing an R-T-E cereal having a high level of perceived saltiness but of reduced salt content comprising the steps of:
   A. providing a read-to-eat cereal base fabricated from a cereal composition having a first salt portion in a concentration ranging from about 0.5% to about 1.2% by weight of the cereal composition;
   B. topically applying a saline solution consisting essentially of water and sodium chloride in amounts sufficient so as to apply a second portion of salt to the surface in a weight ratio of salt to cereal pieces such that the total salt content provided by the first and second salt portions ranges from about 1.2% to 1.8% by weight to form cereal pieces coated with the second salt portion; and
   C. final drying the coated cereal pieces to a moisture content of about 1% to 5% by weight.

2. The product prepared according to the method of claim 1.

3. The method of claim 2 wherein the first salt portion comprises about 30% to 70% by weight of the total salt.

4. The method of claim 3 wherein the saline solution has a salt concentration of about 15% to 40% by weight.

5. The method of claim 4 wherein the saline solution is sprayed onto the ready-to-eat cereal pieces.

6. The method of claim 5 wherein the first salt portion comprises about 50% by weight of the total salt.

7. The product prepared according to the process of claim 1.

8. The product prepared according to claim 6.

9. A method for preparing an R-T-E cereal having a high level of perceived saltiness but of reduced salt content comprising the steps of:
   A. providing a ready-to-eat cereal base fabricated from a cereal composition having a first salt portion in a concentration ranging from about 0.5% to 1.2% by weight of the cereal composition;
   B. topically applying a saline solution consisting essentially of salt, about 0.1% to 10% by weight of the solution of a high potency sweetener, about 0.1% to 1% by weight of the solution of a cold water soluble gum, and the balance water in amounts sufficient so as to apply a second portion of salt to the surface in a weight ratio of salt to cereal pieces such that the total salt content provided by the first and second salt portions ranges from about 1.2% to 1.8% by weight to form salt coated cereal pieces; and C. final drying the coated cereal pieces to a moisture content of about 1% to 5% by weight.

10. The product prepared according to the method of claim 9.

11. The method of claim 10 wherein the first salt portion comprises about 30% to 70% by weight of the total salt.

12. The method of claim 11 wherein the saline solution has a salt concentration of about 15% to 40% by weight.

13. The method of claim 12 wherein the saline solution is sprayed onto the read-to-eat cereal pieces.

14. The method of claim 13 wherein the first salt portion comprises about 50% by weight of the total salt.

15. The method of claim 5 wherein the saline solution has a salt concentration ranging from about 15% to 40%.

16. The method of claim 15 wherein the cereal pieces comprise a whole wheat flake.

17. The method of claim 13 wherein the saline solution has a salt concentration ranging from about 15% to 40%.

18. The method of claim 17 wherein the cereal pieces comprise a whole wheat flake.

* * * * *